Jan. 2, 1962  G. R. SOMERVILLE, JR  3,015,128
ENCAPSULATING APPARATUS
Filed Aug. 18, 1960  4 Sheets-Sheet 4
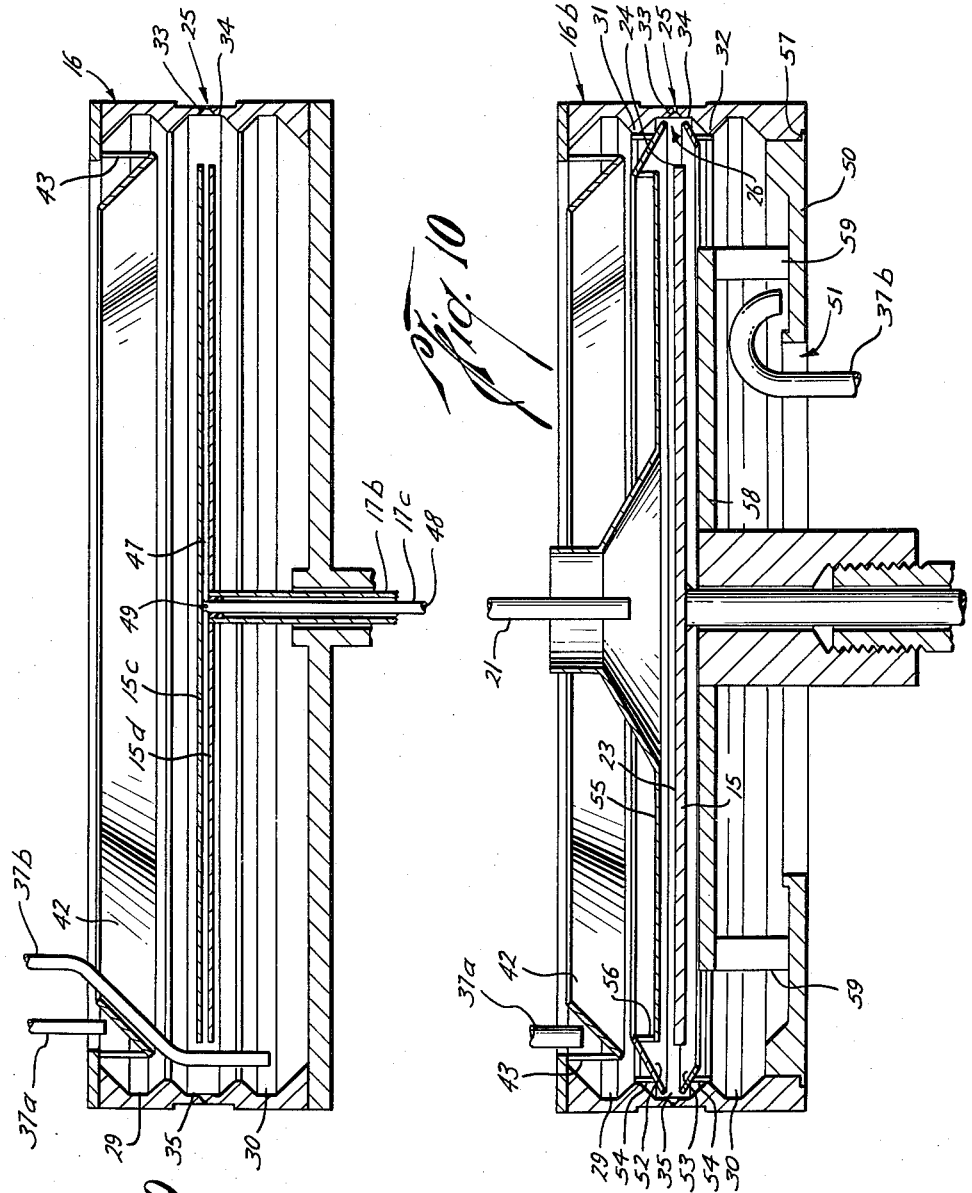
George R. Somerville, Jr.
INVENTOR.
BY
Browning, Simms
Hyer & Eickenroht
ATTORNEY.

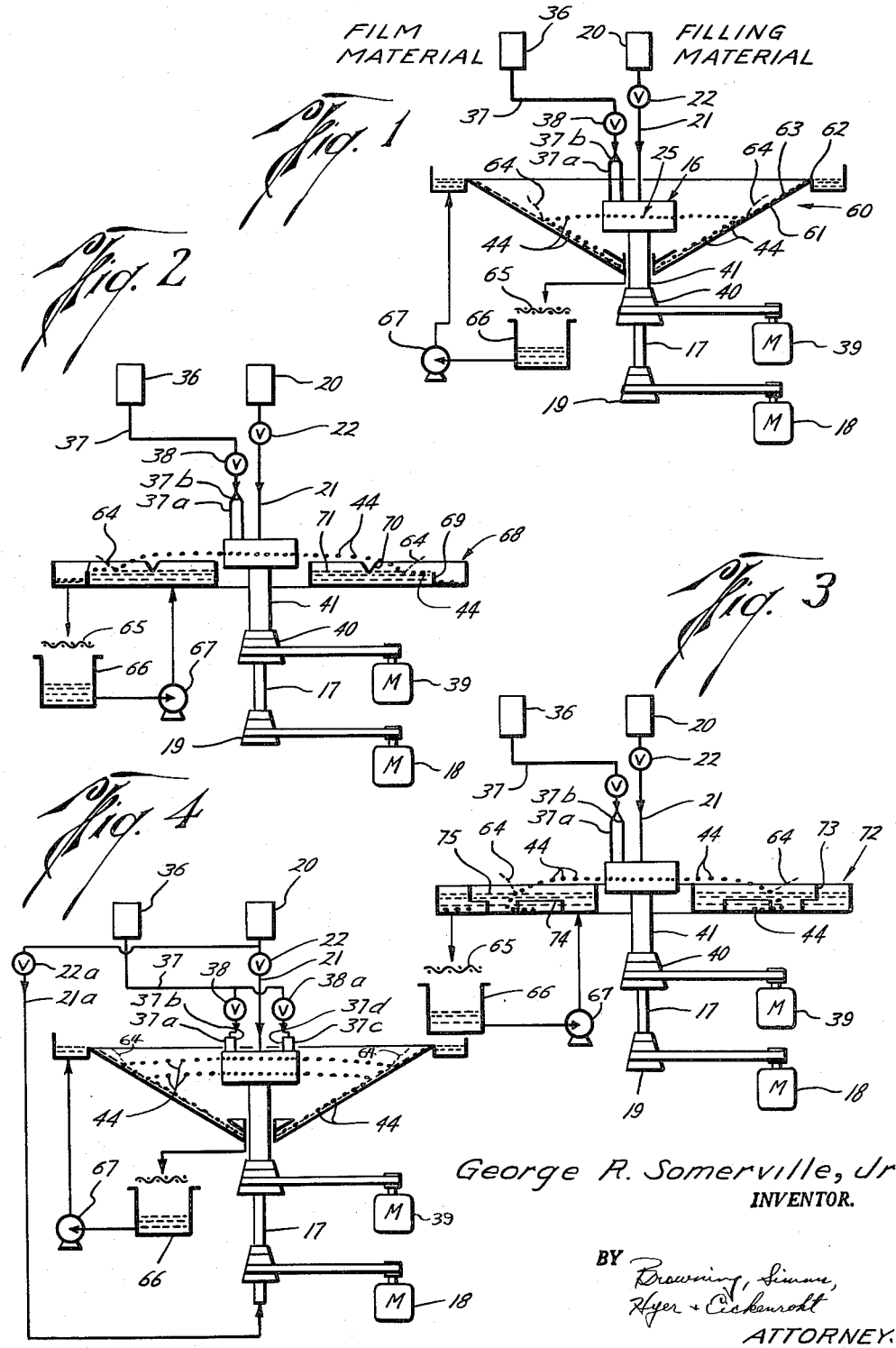

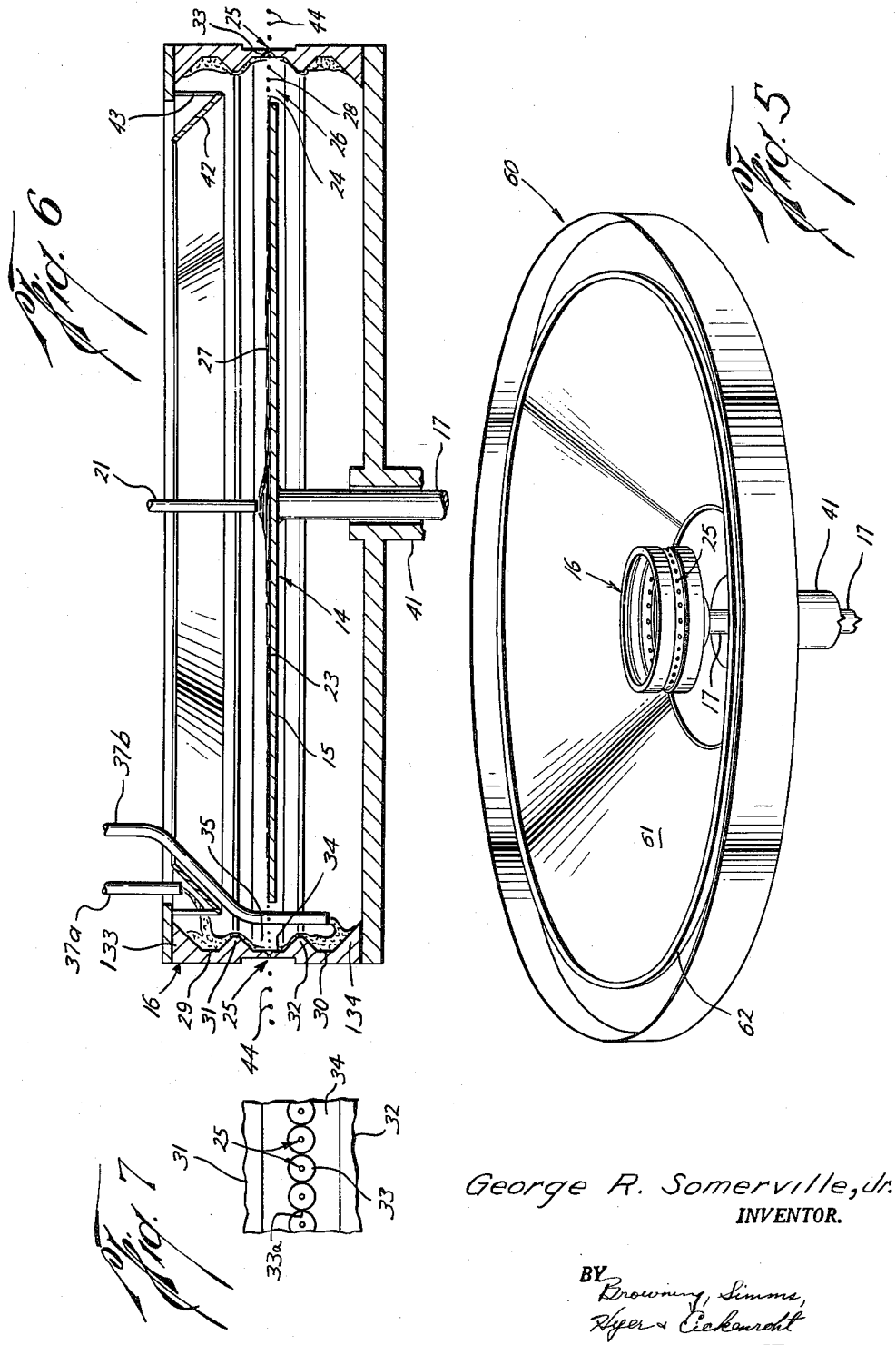

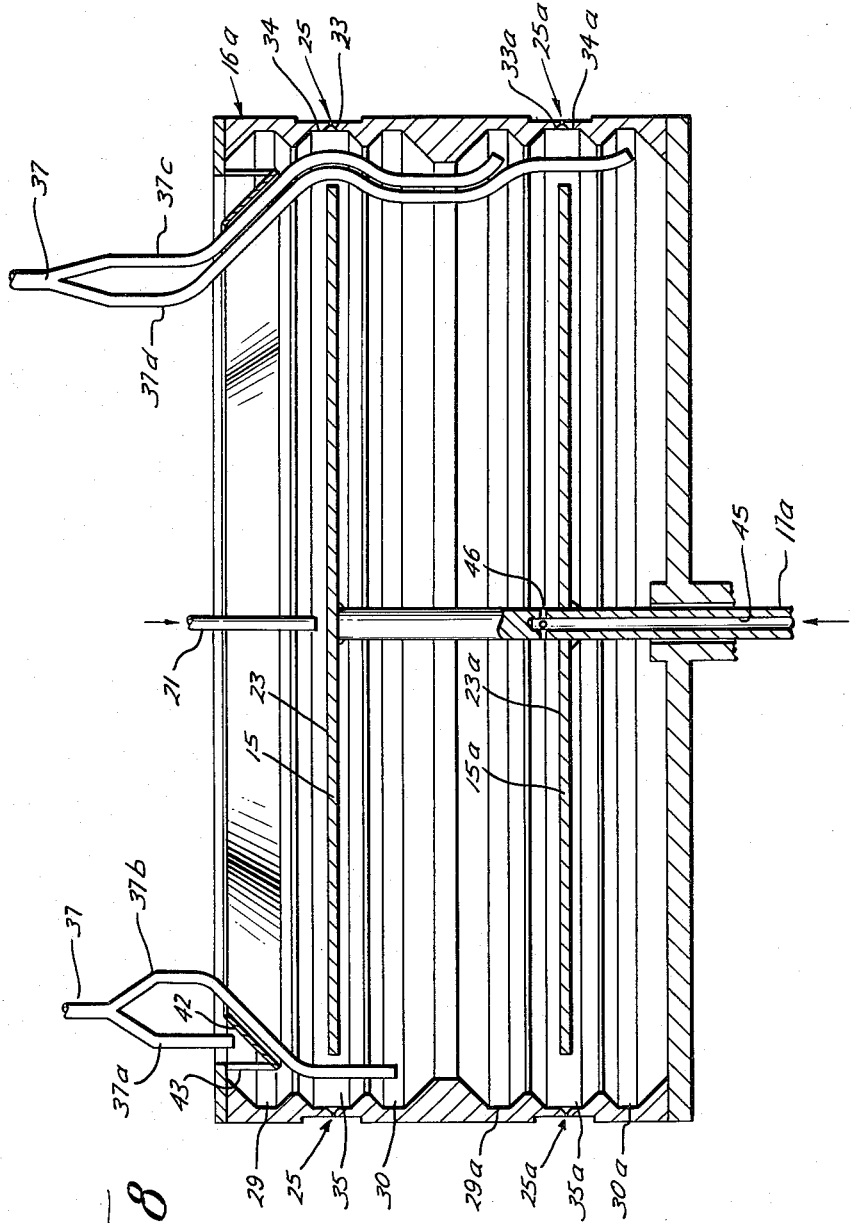

United States Patent Office 3,015,128
Patented Jan. 2, 1962

3,015,128
ENCAPSULATING APPARATUS
George R. Somerville, Jr., San Antonio, Tex., assignor to Southwest Research Institute, San Antonio, Tex.
Filed Aug. 18, 1960, Ser. No. 50,508
12 Claims. (Cl. 18—2.6)

This invention relates to an apparatus for encapsulating a filler material in an encapsulating medium. More particularly, it relates to an improved centrifugal encapsulating apparatus for mass producing capsules of a filler material.

It is often desired to enclose a filler material, either a liquid or solid, in a continuous film of encapsulating medium in order to facilitate handling of such filler material, to protect it from contamination through handling, to protect it from various atmospheric conditions or other factors in its environment which may have an adverse effect thereon, or to keep it separated from other reactive materials until such time as reaction therebetween is desired.

In many instances, it is desirable to encapsulate a filler material in mass quantities to produce many thousands of individual capsules thereof. For same applications, it is necessary to provide mass quantities of relatively small microsized individual capsules of the filler material. In most cases, it is desirable to produce capsules having predetermined characteristics, for example, with respect to the capsule payload, the size and shape of the capsule, the thickness of the capsule wall, and the like.

Apparatus presently being used for mass producing capsules having predetermined characteristics are generally of the type shown in the patent to Raley, 2,766,478, or of the type shown in the patent to Merrill, 2,275,154. These devices comprise a series of vertical concentric tubes arranged to form an annular orifice through which the encapsulating medium is continuously fed to form and suspend successive films thereof across the annular orifice. An inner concentric tube delivers filler material to the inner surface of each suspended encapsulating film until such time as the force of gravity causes the entire mass of suspended film and filler material to break loose from the annular orifice and fall into a hardening bath. In the Raley device, separation of the wet capsule mass from the annular orifice is said to be accomplished in part by a slight pneumatic pressure which is applied to the inner surface of the suspended capsule.

While these and similar mass production encapsulating devices presently in general use differ somewhat in details of construction, they all utilize and depend to a large degree upon the force of gravity to form the wet capsule and to sever the capsule mass from the annular orifice after it has been formed in order to permit formation of another capsule at the orifice.

These gravity operated encapsulating devices have many disadvantages and undesirable features. For example, it has been found that it is not possible, or at least not practical to manufacture capsules smaller than about ⅛ inch in diameter with this type of encapsulating equipment. Capsules of this size are much too large for many important application. In addition, it has been found that as the capsule size is decreased when utilizing this type of equipment, the rate of capsule production is also decreased to the point that manufacture of smaller sized capsules which the equipment may be capable of producing becomes impractical.

More recently, an encapsulating apparatus and process has been developed wherein centrifugal force is utilized to form wet capsules, to sever the centrifugally formed capsules from the encapsulating orifice, and to cast them into a hardening bath or other treating medium. More particularly, in its preferred embodiment this newly developed centrifugal encapsulating apparatus comprises a rotatable nozzle having a chamber therein and an encapsulating insert removably mounted in the chamber, the encapsulating insert having an encapsulating orifice formed in its outer wall. The encapsulating medium is delivered to the encapsulating orifice for forming successive films thereacross through various passageways formed in the nozzle, including an annular outwardly converging slot defined by corresponding spaced-apart conical surfaces formed on telescoping parts of the encapsulating insert. The filler material to be encapsulated is delivered to the inner surfaces of the films of encapsulating medium through a conduit disposed centrally of the annular slot. Means is provided for rotating the nozzle at such speeds as may be required to provide sufficient centrifugal force to cause the films of encapsulating medium to wrap around and encapsulate the filler material contained therein and to sever the centrifugally formed wet capsules from the rotating nozzle and sling them outwardly into a hardening bath.

This centrifugal encapsulating apparatus constitutes a substantial improvement over the gravity operated encapsulating devices and overcomes many of the difficulties and disadvantages thereof, particularly with regard to the capsule size and rate of production. That is, as compared to the gravity operated encapsulating devices, the centrifugal encapsulating nozzle is capable of producing relatively small sized individual capsules of filler material at a relatively high rate of formation.

However, it is nonetheless desirable and it is one of the objects of this invention to provide improved centrifugal encapsulating apparatus which is capable of producing such relatively small sized individual capsules of filler material at an even higher rate of formation.

Another object of this invention is to provide improved centrifugal encapsulating apparatus for encapsulating a filler material, either a liquid or solid, in an encapsulating medium to produce mass quantities of relatively small individual capsules of the filler material which may have substantially uniform and predetermined characteristics.

Another object of the invention is to provide improved centrifugal encapsulating apparatus for producing mass quantities of relatively small individual capsules from a filler material which may be difficult to separate into discrete particles sufficiently small to be encapsulated.

Another object of the invention is to provide improved centrifugal encapsulating apparatus which has a high capacity as compared to the recently developed centrifugal encapsulating nozzle, above mentioned, yet which is relatively simple and economical to manufacture.

Still other objects, advantages and features are inherent and will become apparent upon consideration of the specification, claims and attached drawings.

The apparatus of this invention is illustrated in the attached drawings and represents exemplary forms of the apparatus with which the foregoing and other objects and advantages may be obtained.

In the drawings, wherein like characters of reference designate like parts throughout the several views:

FIGS. 1 through 4 represent centrifugal encapsulating apparatus incorporating novel features of the invention and illustrate novel hardening bath apparatus for catching wet capsules being cast from the encapsulating orifices;

FIG. 5 is an isometric view of a portion of the apparatus of FIG. 1;

FIG. 6 is a cross-section view of one embodiment of a multi-orifice centrifugal encapsulating element constructed according to this invention;

FIG. 7 is an enlarged view of a portion of the inner surface of the apparatus of FIG. 6, showing the manner in which the encapsulating orifices are formed in and disposed about the wall of the outer encapsulating cylinder; and FIGS. 8 through 10 are cross-sectional views of still further embodiments of multi-orifice centrifugal encapsulating elements constructed according to this invention and illustrating various novel features thereof.

Referring now to the drawings, there is illustrated centrifugal encapsulating apparatus in which rotatable impelling means, indicated generally at 14, is provided for impelling a filler material unrestrictedly outwardly to a periphery thereof and for trajecting particles of the filler material from random points about said periphery outwardly toward a bank of encapsulating orifices 25 carried by an outer rotating body or cylinder 16 to be encapsulated in successive films of an encapsulating medium formed across said orifice. The centrifugally formed wet capsules (indicated generally at 44) are cast outwardly from the rotating cylinder into a hardening bath which preferably comprises a moving surface of a hardening liquid disposed in the trajectories of the wet capsules such as is provided by the hardening bath apparatus illustrated in FIGS. 1 through 5.

The term "unrestrictedly" used throughout the specification and claims in describing the manner in which the filler material is impelled outwardly to a periphery of the impelling means during rotation thereof is intended to refer to such apparatus constructed so that the filler material is not positively restrained or confined against angular displacement with respect to the impelling means during its travel outwardly to the periphery thereof, nor are the particles of filler material which are trajected from random points about said periphery necessarily directed to a particular one of said encapsulating orifices.

As illustrated in the embodiment of FIG. 6, such impelling means may comprise a disc 15 mounted for rotation in a cylinder 16. Disc 15 is preferably mounted for rotation independently of cylinder 16 and may be rotated in a desired direction at a desired speed by suitable means such as motor 18, which is adapted to engage a variable drive 19, carried by disc drive shaft 17. Although disc 15 is shown mounted for rotation independently of cylinder 16 and certain advantages are obtained thereby which will be described in more detail hereinbelow, it will be understood that disc 15 and cylinder 16 may be rotated as a unit, rather than indeepndently as shown.

Disc 15 is preferably formed on a diameter smaller than the inner diameter of cylinder 16 to provide an annular space 26 therebetween and the upper surface 23 of disc 15 is substantially flat and free from projections, whereby filler material being delivered to surface 23 during rotation of the disc is impelled radially outwardly and unrestrictedly along said upper surface to the peripheral edge 24 thereof where it is separated into discrete particles (indicated at 28) which are trajected outwardly from random points thereabout across annular space 26 and into indiscriminate ones of encapsulating orifices 25.

Inasmuch as the filler material is not confined or restricted against angular displacement with respect to disc 15, it will be subjected to shear during its travel outwardly along surface 23 toward the peripheral edge thereof. As a result of this shear, the filler material may be drawn into a film of outwardly decreasing thickness (indicated at 27) or even separated into discrete particles of outwardly decreasing size. In any event, this shearing action tends to reduce the size of the particles of filler material being trajected from the peripheral edge of disc 15 toward encapsulating orifices 25. This reduction in particle size may permit the formation of smaller sized capsules from a given filler material than would otherwise be possible if the filler material were confined as by a conduit during its travel radially outwardly to its point of discharge therefrom, or in the alternative, may permit the formation of capsules of a given relatively small size from a filler material that could not otherwise be broken into particles sufficiently small at the point of its discharge from a conduit to form such small capsules.

It will be understood that the speed at which disc 15 should be rotated may vary widely and is related to and depends upon various operating factors, such as the nature of the filler material, particularly with regard to its viscosity and/or its surface tension, the size of annular space 26, the desired size and rate of capsule production, and the like. In any event, disc 15 should be rotated at sufficient speed to separate the filler material into discrete particles of desired size and to traject such particles from random points about the peripheral edge of the disc across annular space 26 and into the counter bores of encapsulating orifices 25. The speed of rotation required for any particular set of operating conditions can be determined by mere routine tests.

In this connection, it will be understood that in some cases it may be desirable to rotate cylinder 16 and disc 15 at different relative speeds. That is, in order for the impelling disc and the encapsulating cylinder to perform their required functions, it may be desirable to rotate these elements at different speeds. For example, in order to separate the filler material into particles of desirable size and to traject these particles across annular space 26, it may be necessary to rotate disc 15 at a much greater speed than would be required of encapsulating cylinder 16. In fact, if cylinder 16 were rotated at the speed required of disc 15, the films of encapsulating medium may be ruptured and prevented from reforming across orifices 25. It is therefore desirable to provide means for rotating the impelling disc and the encapsulating cylinder at different speeds. For this purpose, disc 15 and cylinder 16 are preferably mounted for rotation independently of one another at desired speeds as described above.

According to another novel feature of the centrifugal encapsulating apparatus of this invention, means is provided for unrestrictedly delivering an encapsulating medium (film forming material) to a plurality of encapsulating orifices 25 carried by an outer rotating body or cylinder 16 for forming successive films thereof across the orifices for receiving and encapsulating particles of the filler material being trajected into the orifices from an inner impelling means, for example, rotatable disc 15 described above.

The term "unrestrictedly" used throughout the specification and claims in describing the manner in which the encapsulating medium is delivered to the encapsulating orifices is intended to include apparatus constructed so that the encapsulating medium is not restricted or confined against angular displacement during its flow along the inner surface of the rotating cylinder to the encapsulating orifices nor is it necessarily directed to a particular one of the encapsulating orifices. To the contrary, the encapsulating medium is free to flow circumferentially along the inner surface of the cylinder laterally into indiscriminate ones of the encapsulating orifices about the peripheral edges thereof for forming successive films across the orifices during rotation of the cylinder.

As illustrated in FIGS. 6 and 7, such means for unrestrictedly delivering the encapsulating medium to the encapsulating orifices may comprise three axially spaced-apart grooves 29, 35 and 30 formed circumferentially about the inner wall of the cylinder in planes substantially parallel to surface 23 on disc 15, the intermediate groove 35 being substantially coplanar with said surface. A plurality of encapsulating orifices 25 are formed in a bank circumferentially about cylinder 16, preferably by being countersunk as at 33 in the bottom wall 34 of intermediate groove 35. As best seen in FIG. 7, the orifices are preferably spaced sufficiently close to one another so that the upper or innermost edges of countersunk surfaces 33 of adjacent orifices are substantially tangential to one another as at 33a, so that the particles of filler material being trajected outwardly toward orifices 25 will tend to be deflected inwardly to one or the other of said adjacent orifices.

As best shown in FIG. 6, the side walls 31 and 32 separating intermediate groove 35 from upper and lower grooves 29 and 30, respectively, preferably extend radially inwardly a shorter distance than the upper and lower side walls 133 and 134 of grooves 29 and 30, respectively, to provide a weir or dam separating the upper and lower grooves from the intermediate one of the grooves. Thus encapsulating medium being delivered from lines 37a and 37b during rotation of the cylinder flows centrifugally outwardly into upper and lower grooves 29 and 30, respectively, until the grooves are filled to the top of weirs 31 and 32. Continued introduction of encapsulating medium causes it to overflow the weirs and flow centrifugally downwardly and outwardly along the side walls of intermediate groove 35 to the bottom wall 34 thereof, and thence downwardly and outwardly along counterbores 33 into encapsulating orifices 25 about the peripheral edges thereof for forming successive films thereacross for receiving particles of filler material to be encapsulated therein.

Inasmuch as the encapsulating medium is not restricted or confined against angular displacement with respect to rotating cylinder 16, it is free to centrifugally flow circumferentially about and axially along the inner surface of the cylinder into indiscriminate ones of encapsulating orifices 25, rather than being directed to a particular one of the orifices as in the case where the encapsulating medium is confined, as by an annular slot or similar passageway, during its travel radially outwardly to the orifices. This arrangement not only simplifies and substantially reduces the manufacturing costs of the equipment, but also provides for much higher capacity since a large number of encapsulating orifices can be located closely together in banks about the cylinder without requirement of providing a separate encapsulating medium delivery slot or passageway for each orifice. If desired, separating walls 31 and 32 may be eliminated so that the encapsulating medium will centrifugally flow unrestrictedly circumferentially about the inner surface of the cylinder 16 between walls 133 and 134 and laterally into the encapsulating orifices as described above.

As previously mentioned, cylinder 16 is preferably mounted for rotation independently of disc 15, and may be rotated in a desired direction at a desired speed by suitable means, such as motor 39 which is adapted to engage a variable drive 40, carried by cylinder shaft 41. As will be seen, the speed at which the cylinder 16 should be rotated is related to and depends upon a number of operating variables including the size and radius of rotation of the encapsulating orifices, the desired size and rate of capsule production, the nature of the encapsulating medium, particularly with regard to its viscosity and solids content, and the like. In any event, the speed of rotation of the cylinder 16 should be sufficient to cause the encapsulating medium to flow centrifugally outwardly into grooves 29 and 30 and into orifices 25 for forming successive films thereacross as described above, to encapsulate the particles of filler material being delivered to the inner surfaces of said films, and to sever the centrifugally formed wet capsules from the encapsulating orifices and cast them outwardly therefrom into a hardening bath. The speed of rotation required for any particular set of operating conditions can be determined by mere routine tests.

During operation, filler material is preferably delivered to surface 23 on disc 15 at a controlled rate from container 20 through line 21 by suitable means such as control valve 22, while encapsulating medium (film forming material) is delivered to upper and lower grooves 29 and 30 in cylinder 16 at a controlled rate from container 36 through line 37 and branch lines 37a and 37b, respectively, by suitable means such as control valve 38. As best seen in FIG. 6, a baffle 42 carried by spaced-apart tabs 43 on rotating cylinder 16 may be provided for deflecting encapsulating medium from branch line 37a into upper groove 29. It will be understood that the ability to control the flow rates of the filler material and the encapsulating medium is considered desirable inasmuch as certain of the characteristics of the finished capsules, particularly with regard to capsule payload and capsule size, are affected by the relative flow rates of these materials, as well as by other variables within the control of the operator. For example, with a given set of encapsulating conditions, increasing the relative flow rate of the encapsulating medium tends to decrease the capsule payload, while increasing the flow rates of both the filler material and encapsulating medium tends to increase the capsule size.

It is believed that the construction and operation of the centrifugal encapsulating apparatus of this invention, as well as certain of the advantages and desirable features provided thereby will be clearly understood by those in the art in view of the foregoing description. However, a summary of the variables within the control of the operator which may affect the characteristics of the finished capsules, as well as a summary of certain of the inherent operational characteristics of the apparatus, will be helpful in this regard. In the following discussion, unless otherwise stated, it is assumed that operating variables, other than the particular variable being discussed, are maintained constant so that the effect on the capsule characteristics resulting from changing the particular operating variable in the direction indicated can be demonstrated. As will be understood, it may be necessary to change one or more of these operation variables in the direction indicated in order to provide capsules having desired characteristics when operating under a given set of conditions.

*Speed of rotation of the cylinder and disc.*—The speed of rotation of the cylinder affects the size and rate of capsule formation. That is, with other factors remaining constant, increased rotational speed results in the production of smaller capsules at a higher rate of formation, while decreased rotational speed of the cylinder results in production of larger capsules at a slowed rate of formation.

The speed of rotation of the disc affects the particle size of the filler material being trajected toward the encapsulating orifices and also affects the trajectory of paths of the particles. That is, with other factors remaining constant, increased rotational speed of the disc results in production of smaller sized particles and/or flatter trajectories, while decreased rotational speed results in production of larger particles and/or shorter trajectories.

*Orifice size.*—The capsule size is related to and is affected by the size of the encapsulating orifices. That is, smaller orifices result in smaller sized capsules, while larger orifices result in larger sized capsules. However, control of other variables such as rotational speed of the cylinder and the disc, relative flow rates of the filler material and encapsulating medium, and the like permit the formation of capsules in a relatively wide range with any given orifice size. Generally speaking, smaller sized orifices require greater speeds of rotation.

*Encapsulating rate.*—A typical rate of capsule formation which may be obtained when utilizing gravity operated encapsulating equipment is about 35 capsules per minute. Capsules produced at this rate are considerably larger than the ⅛ inch minimum diameter which this equipment is capable of producing. A typical rate of capsule formation obtainable when utilizing the recently developed centrifugal encapsulating nozzle for producing capsules in the 500 micron size range is about 1,200 capsules per minute.

In contrast to these production rates, centrifugal encapsulating apparatus constructed according to this invention and having one bank of encapsulating orifices comprising 180 orifices formed about an 8 inch cylinder, each orifice being designed to produce capsules in the 500 micron size range, is capable of forming such capsules at the rate of about 1,200 capsules per minute per orifice for a total production rate of about 216,000 capsules per minute. This of course constitutes a tremendous increase in capacity, yet is made possible by apparatus that is relatively easy and economical to manufacture.

As will be understood, the capacity of this apparatus can easily be increased still further, for example, by increasing the number of encapsulating orifices provided in each bank and/or by providing a plurality of axially spaced-apart banks of encapsulating orifices, such as is shown in the embodiment of FIG. 8, without substantially increasing the cost of manufacturing the equipment.

*Percent solids in encapsulating medium.*—The percent solids in the encapsulating medium affects the capsule shell thickness after drying has taken place. That is, a lower percent of solids in the encapsulating medium permits a greater shrinkage thereof upon drying and, therefore, produces a thinner capsule shell. It has been found that the centrifugal encapsulating apparatus of this invention can utilize encapsulating medium having relatively low percent solids and a correspondingly high shrinkage factor, which permits production of capsules having extremely thin walls.

*Viscosity of encapsulating medium.*—Variations in viscosity of the encapsulating medium affect several characteristics of the capsules, particularly the production rate and capsule payload. That is, higher viscosities tend to reduce both the capsule payload and the rate of production, while lower viscosities tend to increase both the capsule payload and the rate of production.

In cases where the filler material has a relatively high density, it may be desirable to increase the viscosity of the encapsulating medium in order to prevent penetration of the films formed across the encapsulating orifices by the particles of filler material impelled outwardly thereto by the inner impelling means. In addition, for a given percent of solids in the encapsulating medium, decreases in viscosity thereof result in thinner capsule shells.

Generally speaking, as the size of the encapsulating orifice is decreased, the viscosity of the encapsulating medium should also be decreased. However, if the viscosity of the encapsulating medium is too low for a given orifice size, the films thereacross may rupture and not reform as desired.

*Viscosity and surface tension of filler material.*—Variations in viscosity and surface tension of the filler material affect the capsule characteristics, particularly with regard to the size of the capsules being produced. That is, for a given set of operating conditions, higher viscosities and/or higher surface tensions tend to increase the size of the capsules produced, while lower viscosities and/or surface tensions tend to decrease the size of the capsules produced. Also, filler material having relatively high viscosities may be difficult to form into spherical capsules since the particles of filler material being trajected from the disc into the encapsulating orifices may have an elongated or other irregular shape and cannot easily be drawn into capsules of spherical shape by surface tension before the capsule is hardened in the hardening bath. Under these conditions, it may be helpful to rotate the cylinder and disc in opposed directions since the additional impact of the particles of filler against the counterbores of the orifices and/or the films of encapsulating medium obtained thereby for a given speed of rotation of each of these elements may help form the irregular particles of viscous filler material into a desired shape. Further, pairs of closely spaced shear discs as shown in the embodiment of FIG. 9, may be used to advantage when encapsulating a filler material that is difficult to separate into small particles of desired size.

*Types of encapsulating medium and filler material.*—It has been found that a wide variety of encapsulating medium and filler material, both liquid and solid, can be used in the apparatus of this invention, and the primary requirement in this respect is that these materials should be substantially immiscible for most applications. The encapsulating medium (film forming material) should have sufficient surface tension to maintain and reform successive films across the encapsulating orifice and also should have sufficient surface tension to give a spherical shape, when required, to the wet capsules while they are in a fluid state. In the case of solid filler materials, the embodiment shown in FIG. 10 may be useful to reduce dusting of the filler material into the atmosphere about the apparatus to concentrate the flow of the solid particles of filler material being trajected from the impelling means into the encapsulating orifices and against the films of encapsulating medium formed thereacross.

The following example will serve to illustrate the operation of the encapsulating apparatus of this invention, as well as demonstrate the ability of the apparatus to produce relatively small sized individual capsules of filler material at a high rate of capsule formation.

*Example*

Outside cylinder:
   Outside diameter _____ inches__ 8
   Number of orifices _____ 180
   Size of orifices _____ inches__ .045
   Radius of rotation of orifices _____ do____ 4
   Speed of rotation _____ r.p.m.__ 525

Inner disc:
   Outside diameter _____ inches__ 5¾
   Speed of rotation _____ r.p.m.__ 1920

Encapsulating medium (percent composition by weight:
   12.0% polyvinyl alcohol (PVA 1/30, Shawinigan Resins Corp.)
   0.6% sodium alginate (XRA–50, Marine Colloids)
   12.0% glycerol
   75.4% water Filler material: Kerosene
Hardening bath: 20% aqueous calcium chloride Under above conditions, capsules of about 500 microns in diameter were produced at a rate of about 20 capsules per orifice per second (216,000 total per minute), the capsules having a shell thickness of about 15 microns.

Turning now to FIG. 8, there is illustrated apparatus adapted for even higher capacity of capsule production. As shown, the embodiment of FIG. 8 essentially comprises a pair of encapsulating elements, such as shown in FIG. 6, stacked vertically upon one another to thereby double the production capacity of the apparatus without substantially increasing the cost of manufacture. That is, a bank of encapsulating orifices 25 countersunk at 33 in the bottom wall 34 of an intermediate groove 35, with upper and lower grooves 29 and 30, respectively, vertically spaced apart on either side of intermediate groove 35 is provided in the upper portion of cylinder 16a. Filler material is fed to the upper surface 23 of rotatable disc 15 through filler line 21, while encapsulating medium is fed to the upper and lower grooves 29 and 30 through branch lines 37a and 37b, respectively, similarly as in the case of the embodiment of FIG. 6.

The lower portion of cylinder 16a is constructed similarly as is the upper portion thereof and similarly as is the apparatus of FIG. 6. That is, a second bank of encapsulating orifices 25a, spaced axially apart from orifices 25, are countersunk as at 33a in the bottom wall 34a of intermediate groove 35a, with upper and lower grooves 29a and 30a, respectively, being axially spaced apart on either side of intermediate groove 35a. Filler material is fed to the upper surface 23a of disc 15a through a bore 45 and ports 46 formed in disc drive shaft 17a, while encapsulating medium is fed to upper and lower grooves 29a and 30a through branch lines 37c and 37d, respectively.

The operation of this device is the same as was described in connection with the embodiment of FIG. 6. However, it should be noted that merely by adding a second bank of encapsulating orifices, together with an additional impelling disc, the capacity of the equipment may be doubled without substantially increasing the cost of its manufacture. That is, under the conditions of the foregoing example and with each bank of encapsulating orifices having 180 orifices as there specified, the apparatus of FIG. 8 would be capable of producing capsules at the rate of about 432,000 per minute, the capsules being approximately 500 microns in diameter and having a shell thickness of about 15 microns. Of course, additional banks of encapsulating orifices could be added to further increase the capacity of the apparatus as will be understood in view of the foregoing description.

Turning now to FIG. 9, there is illustrated centrifugal encapsulating apparatus which is particularly well adapted for encapsulating a filler material which may be difficult to separate into discrete particles sufficiently small for forming capsules of the desired size range. In the embodiment illustrated, the cylinder 16, encapsulating orifices 25, grooves 29, 35 and 30, and supply lines 37a and 37b may all be the same as that shown in the embodiment of FIG. 6. That is, the outer cylinder may be constructed and the apparatus operated in the same manner as previously described in connection with the embodiment of FIG. 6. However, for purpose of providing sufficient shearing force to separate the filler material into relatively small discrete particles, a pair of parallel substantially flat axially spaced-apart shear discs 15c and 15d have been provided, which in this case are mounted for counter-rotation on shafts 17b and 17c, respectively. Of course, the discs may be mounted for rotation in the same direction at different speeds, or one disc may be stationary and the other disc rotated. In any event, it is desirable to provide for relative rotation of the discs with respect to one another. Filler material is fed into the annular space 47 between discs 15c and 15d through bore 48 and ports 49 formed in disc drive shaft 17c. As will be understood, discs 15c and 15d are spaced apart a sufficient distance so that filler material being impelled unrestrictedly outwardly through space 47 therebetween during rotation of the discs will be subjected to a relatively high shear to thereby separate the filler material into relatively small discrete particles which are trajected outwardly from the peripheral edges of the discs toward the encapsulating orifices in the outer rotating cylinder in the manner previously described.

Turning now to FIG. 10, there is illustrated centrifugal encapsulating apparatus having concentrating means interposed between outer rotatable cylinder 16b and inner rotatable impelling disc 15 for deflecting the particles of filler material being trajected through annular space 26 from the disc and directing them in concentrated streams into encapsulating orifices 25 carried by the cylinder. As shown, such concentrator means may comprise a pair of axially spaced-apart annular bands 52 and 53 connected to the inner surface of cylinder 16b on either side of orifices 25, as by spaced tabs 54. Bands 52 and 53 are preferably angularly disposed with respect to one another and with respect to disc 15 to provide opposed outwardly converging surfaces disposed in the paths of the particles of filler material being trajected outwardly from disc 15 for deflecting said particles and directing them in concentrated streams into encapsulating orifices 25. Such concentrator means may be used to advantage when encapsulating any type of filler material, but is particularly useful when encapsulating solid particles of filler material which may tend to follow erratic paths through annular space 26 when trajected from rotating disc 15.

In some cases, particularly when encapsulating a solid filler material, extremely small dust-like particles may tend to rise from rotating disc 15 and contaminate the area about the apparatus. This is an undesirable situation, particularly when encapsulating filler materials which may be toxic or otherwise of a dangerous nature. To relieve this situation, a dust cover 55 spaced axially above disc 15 and connected at its outer edge 56 to upper annular band 52 may be provided. In some applications, it may be desirable to eliminate dust cover 55 and operate the apparatus utilizing only the concentrator means.

It will be understood that the apparatus of FIG. 10 may be otherwise constructed and operated similarly as the embodiment of FIG. 6 above described. However, when utilizing dust cover 55, it may be desirable to form the outer encapsulating cylinder in two parts for assembly purposes. Thus, the lower portion of cylinder 16b may comprise an annular plate 50 carried on rotor 58 by spaced arms 59, plate 50 being adapted to be releasably and non-rotatably connected to the upper portion of cylinder 16b at 57 by any suitable means. With this arrangement, the cylinder may be assembled by lowering its upper portion into position in surrounding relationship to disc 15, and plate 50 may then be raised into position and connected to the upper portion to complete the assembly of the cylinder. Branch line 37b may be inserted through annular space 51 in plate 50 for delivering an encapsulating medium to the upper surface of the plate. During rotation of the cylinder, the encapsulating medium flows centrifugally outwardly along plate 50 into lower groove 30 and thence into encapsulating orifices 25 as previously described in connection with FIG. 6.

It will be recalled that the centrifugally formed wet capsules (indicated at 44) are severed from the rotating encapsulating orifices and are cast outwardly therefrom into a hardening bath. In cases where the hardening medium comprises a liquid, it may be desirable to provide a moving surface of such hardening liquid disposed in the trajectories of the wet capsules for catching them and removing them from their points of impact to a point remote therefrom. This not only reduces the tendency of the capsules to stack up and stick together at their points of impact before they can be adequately cured by the hardening liquid, particularly in the case of extremely high rates of capsule production, but also provides a means for continuously separating and recovering the capsules from the hardening liquid so that it may be recirculated to provide a substantially continuous operation. Further, it may be desirable to locate the moving surface of hardening liquid so that any droplets of the hardening liquid (indicated at 64) which may be splashed from the surface thereof, as by the impact of the capsules being caught therein, will be directed away from the encapsulating orifices, thereby reducing the tendency for the orifices to become clogged.

Hardening bath apparatus capable of providing a liquid hardening medium having the foregoing desirable features is illustrated in FIGS. 1–5. More particularly, and first with reference to the embodiment shown in FIGS. 1, 4 and 5, such hardening bath apparatus may comprise a vessel 60 having a conical inner surface or wall 61 disposed in the trajectories of the wet capsules 44 being cast outwardly from encapsulating orifices 25 during rotation thereof, the upper portion of wall 61 forming a weir or dam 62 over which a hardening liquid overflows to provide a conical moving surface of hardening liquid (indicated by dotted lines at 63) into which the capsules are cast and continuously removed from their points of impact. As shown, any droplets of hardening liquid (indicated at 64) which may splash from the surface thereof due to impact of the capsules will be directed outwardly from the encapsulating orifices.

The hardening liquid containing the capsules flows down wall 61 to the bottom of vessel 60 where it is collected and passed to suitable separating means, such as sieves 65, where the capsules are recovered. The hardening liquid passing through sieves 65 may be caught in a surge tank 66 for recirculation through vessel 60 by suitable means, such as pump 67. It will also be understood that the apparatus of FIGS. 1, 4 and 5, permit decreased bath diameters as compared to horizontal baths such as shown in FIGS. 2 and 3. Reduction in hardening bath diameter is desirable when cylinder 16 is being rotated at relatively high speeds causing capsules 44 to be cast therefrom in relatively flat trajectories. In addition, such apparatus can be used to particular advantage in connection with apparatus having axially spaced-apart banks of encapsulating orifices such as illustrated in the embodiment of FIG. 4.

Turning now to the embodiment of FIGS. 2 and 3, there is illustrated hardening bath apparatus adapted to dispose a horizontal moving surface of a hardening liquid in the trajectories of the capsules being cast from encapsulating orifices 25 during rotation thereof. The apparatus of FIG. 2, which may be used to advantage when the capsules are of lower density than the hardening liquid, comprises a vessel 68 having a circular weir or dam 69 spaced radially outwardly from and circumferentially about cylinder 16, weir 69 having notches 70 cut in its upper edges. As shown, weir 69 is spaced radially outwardly from orifices 25 a sufficient distance so are to be disposed outside the contemplated trajectories of the capsules. Hardening liquid from surge tank 66, preferably of greater density htan that of capsules being produced, is introduced into vessel 68 at a point radially inwardly from weir 69 and is circulated radially outwardly therethrough by suitable means, such as pump 67, to provide a horizontal moving surface of hardening liquid (shown in dotted lines at 71) for catching capsules 44 being cast from rotating encapsulating nozzles 25 and removing them from their points of impact. Inasmuch as the capsules are being cast outwardly into a horizontal moving surface of hardening liquid, any droplets thereof (indicated at 64) which may be splashed from said surface due to the impact of the capsules, are directed away from encapsulating orifices 25. The hardening liquid containing the capsules overflows weir notches 70 and is collected and passed through separating sieves 65 where the capsules are recovered. The hardening liquid passing through the sieves may be returned to surge tank 66 for recirculation through vessel 68.

The apparatus of FIG. 3, which may be used to advantage when the capsules are of greater density than the hardening liquid, comprises a vessel 72 having a circular weir or dam 73 spaced radially outwardly from and circumferentially about cylinder 16 beyond the contemplated trajectories of capsules 44, weir 73 having slots 74 at the lower portion thereof. Hardening liquid from surge tank 66, preferably of lower density than that of the capsules being produced, is introduced into vessel 72 at a point radially inwardly from weir 73 and is circulated radially outwardly therethrough by suitable means, such as pump 67, to provide a horizontal moving surface of hardening liquid (shown in dotted lines at 75) for catching capsules 44 being cast from encapsulating orifices 25 during rotation thereof and removing them from their points of impact. As shown, any droplets of hardening liquid (indicated at 64) which may be splashed from the surface thereof due to impact of the capsules are directed away from the encapsulating orifices. The hardening liquid containing capsules flows through lower weir slots 74 and is subsequently collected and passed through sieves 65 where the capsules are recovered. The hardening liquid passing through the sieves may be returned to surge tank 66 for recirculation through vessel 72.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Centrifugal encapsulating apparatus for encapsulating a filler material in an encapsulating medium comprising, in combination, a rotatable cylinder having a plurality of spaced-apart encapsulating orifices; means for delivering an encapsulating medium to said encapsulating orifices for forming successive films thereacross during rotation of the cylinder; impelling means rotatably mounted in said cylinder having a surface for impelling a filler material unrestrictedly outwardly to a periphery thereof and for trajecting particles of said filler material from random points about said periphery outwardly toward indiscriminate ones of said encapsulating orifices during rotation of the impelling means; means for delivering a filler material to said surface on the impelling means; and means for rotating said cylinder and said impelling means at desired speeds.

2. Centrifugal encapsulating apparatus according to claim 1 wherein said impelling means comprises a rotatable disc formed on a diameter smaller than the inner diameter of said cylinder to provide an annular space therebetween, the upper surface of said disc being substantially free from projections for receiving said filler material and impelling same centrifugally outwardly therealong to random points about the periphery thereof and for trajecting particles of said filler material outwardly therefrom through said annular space toward said encapsulating orifices during rotation of the disc.

3. Centrifugal encapsulating apparatus according to claim 2 in combination with concentrator means interposed between said cylinder and disc, said concentrator means having outwardly converging surfaces disposed in the paths of said particles of filler material being trajected outwardly from said rotating disc through said annular space for deflecting said particles and directing them in concentrated streams into said encapsulating orifices.

4. Centrifugal encapsulating apparatus for encapsulating a filler material in an encapsulating medium comprising, in combination, a cylinder rotatable about its vertical axis and having a plurality of spaced-apart encapsulating orifices in its walls disposed circumferentially thereabout; means for unrestrictedly delivering an encapsulating medium at a controlled rate to said encapsulating orifices for forming successive films thereof across the orifices during rotation of the cylinder; impelling means including a disc in said cylinder mounted for rotation therein independently of the cylinder, the upper surface of said disc being substantially free from projections and being formed on a diameter smaller than the inner diameter of said cylinder to provide an annular space therebetween; means for delivering a filler material at a controlled rate to said upper surface of the disc; and means for individually rotating said disc and cylinder at desired speeds, whereby the filler material being delivered to the upper surface of the disc during rotation thereof is impelled centrifugally outwardly unrestrictedly along said upper surface to the peripheral edge thereof and particles of said filler material are trajected from random points about said peripheral edge outwardly through said annular space into indiscriminate ones of said encapsulating orifices.

5. Centrifugal encapsulating apparatus for encapsulating a filler material in an encapsulating medium comprising, in combination, a rotatable cylinder having a plurality of spaced-apart encapsulating orifices disposed in an annular band about its inner surface; means for unrestrictedly delivering an encapsulating medium to said inner surface for flow circumferentially thereabout into indiscriminate ones of said encapsulating orifices for forming successive films thereof across the orifices during rotation of the cylinder; means for rotating said cylinder; and means in the cylinder for trajecting particles of a filler material outwardly into said encapsulating orifices.

6. Centrifugal encapsulating apparatus for encapsulating a filler material in an encapsulating medium comprising, in combination, a rotatable cylinder having a plurality of spaced-apart encapsulating orifices; means for unrestrictedly delivering an encapsulating medium to indiscriminate ones of said encapsulating orifices for forming successive films thereacross during rotation of the cylinder; impelling means mounted for rotation in said cylinder for impelling a filler material unrestrictedly outwardly to a periphery thereof and for trajecting particles of said filler material from random points about said periphery outwardly into indiscriminate ones of said encapsulating orifices during rotation of the impelling means; and means for rotating said cylinder and said impelling means at desired speeds.

7. Centrifugal encapsulating apparatus for encapsulating a filler material in an encapsulating medium comprising, in combination, a rotatable cylinder, said cylinder having three axially spaced-apart grooves formed circumferentially about its inner wall, side walls separating the intermediate one of said grooves from the upper and lower ones of said grooves extending radially inwardly a shorter distance than the upper and lower side walls of said upper and lower grooves, respectively; a plurality of spaced-apart encapsulating orifices formed circumferentially about the bottom wall of said intermediate groove; means for delivering an encapsulating medium at a controlled rate to said upper and lower grooves; impelling means including a disc in said cylinder mounted for rotation therein independently of said cylinder, said disc being formed on a diameter smaller than the inner diameter of said cylinder to provide an annular space therebetween and the upper surface of said disc being substantially flat and free from projections; means for delivering a filler material at a controlled rate to the upper surface of said disc; and means for independently rotating said cylinder and said disc at desired speeds, whereby said encapsulating medium is caused to centrifugally flow from said upper and lower grooves over said separating walls into said intermediate groove and then circumferentially thereabout into indiscriminate ones of said encapsulating orifices for forming successive films thereacross, and said filler material is caused to centrifugally flow outwardly along said upper surface to the periphery thereof and to be trajected in discrete particles from random points about said periphery through said annular space toward indiscriminate ones of said encapsulating orifices.

8. Centrifugal encapsulating apparatus for encapsulating a filler material in an encapsulating medium comprising, in combination, a rotatable cylinder having a plurality of spaced-apart encapsulating orifices; means for delivering an encapsulating medium to said encapsulating orifices for forming successive films thereof across the orifices during rotation of the cylinder; impelling means including a pair of axially spaced-apart shear discs in said cylinder mounted for rotation therein relative to one another for separating a filler material into relatively small particles and trajecting said particles outwardly toward said encapsulating orifices; means for delivering a filler material to the space between said shear discs; and means for rotating said cylinder and the rotatable ones of said shear discs.

9. Centrifugal encapsulating apparatus for encapsulating a filler material in an encapsulating medium comprising, in combination, a rotatable cylinder having a plurality of spaced-apart encapsulating orifices in its walls disposed circumferentially thereabout; means for unrestrictedly delivering an encapsulating medium at a controlled rate to indiscriminate ones of said encapsulating orifices for forming successive films thereof across the orifices during rotation of the cylinder; impelling means including a pair of axially spaced-apart counter rotating shear discs coaxially mounted for rotation in said cylinder, said shear discs having substantially flat opposed shearing surfaces and being formed on diameters smaller than the inner diameter of said cylinder to provide an annular space therebetween; means for delivering a filler material at a controlled rate to the space between said counter rotating shear discs; and means for independently rotating said shear plates and said cylinder at desired speeds, whereby said filler material being delivered to the space between said counter rotating shear discs is separated into a plurality of relatively small discrete particles which are trajected outwardly from random points about the peripheral edges of said discs through said annular space toward indiscriminate ones of said encapsulating orifices.

10. Centrifugal encapsulating apparatus for encapsulating a filler material in an encapsulating medium comprising, in combination, an annular rotatable body having a plurality of axially spaced-apart banks of encapsulating orifices; means for unrestrictedly delivering an encapsulating medium to random ones of said encapsulating orifices for forming successive films thereacross during rotation of the body; impelling means rotatably mounted in said annular body for impelling a filler material unrestrictedly outwardly to a periphery thereof and for trajecting particles of said filler material from random points about said periphery outwardly toward said banks of encapsulating orifices; means for delivering a filler material to said impelling means; and means for rotating said annular body and said impelling means at desired speeds.

11. Centrifugal encapsulating apparatus for encapsulating a filler material in an encapsulating medium comprising, in combination, a rotatable cylinder having a plurality of spaced apart encapsulating orifices, said encapsulating orifices being disposed circumferentially about said cylinder in axially spaced apart banks; means for unrestrictedly delivering an encapsulating medium to indiscriminate orifices in each of said banks of encapsulating orifices for forming successive films thereof across the orifices during rotation of the cylinder; impelling means including a plurality of axially spaced-apart discs rotatably mounted in said cylinder, the upper surfaces of said discs being substantially flat and free from projections; means for delivering filler material to said upper surfaces of the discs; and means for rotating said cylinder and said discs.

12. Centrifugal encapsulating apparatus for encapsulating a filler material in an encapsulating medium comprising, in combination, a cylinder mounted for rotation about its vertical axis, said cylinder having a plurality of axially spaced-apart parallel banks of encapsulating orifices, each of said banks including a plurality of spaced-apart encapsulating orifices formed in the bottom wall of a groove disposed circumferentially about the inner surface of the cylinder in a substantially horizontal plane; means including a plurality of weirs disposed circumferentially about the inner surface of said cylinder spaced axially apart on either side of each of said grooves for unrestrictedly delivering an encapsulating medium at a controlled rate to indiscriminate ones of said encapsulating orifices in each of said banks for forming successive films across the orifices during rotation of the cylinder; a plurality of axially spaced-apart discs coaxially mounted for rotation in said cylinder, the upper surfaces of said discs being substantially flat and free from projections and being formed on diameters smaller than the inner diameter of said cylinder to provide an annular space therebetween; means for delivering a filler material at a controlled rate to said upper surfaces of the discs; and means for rotating said discs and said cylinder at desired speeds, whereby the filler material being delivered to the upper surfaces of the discs during rotation thereof is impelled centrifugally outwardly therealong to the peripheral edges thereof and particles of said filler material are trajected from random points about said periphery outwardly through said annular space into the encapsulating orifices in each of said banks to be centrifugally encapsulated in the films of encapsulating medium formed thereacross.

References Cited in the file of this patent

UNITED STATES PATENTS

| | | |
|---|---|---|
| 2,471,358 | Stephenson | May 24, 1949 |
| 2,616,214 | Lyle | Nov. 4, 1952 |
| 2,624,069 | Fisher | Jan. 6, 1953 |
| 2,692,404 | Plourde | Oct. 26, 1954 |
| 2,766,478 | Raley | Oct. 16, 1956 |
| 2,897,539 | McMillan | Aug. 4, 1959 |

FOREIGN PATENTS

| | | |
|---|---|---|
| 1,154,476 | France | Dec. 4, 1957 |
| 788,491 | Great Britain | Jan. 2, 1958 |